US012526290B2

(12) United States Patent
Thomas et al.

(10) Patent No.: US 12,526,290 B2
(45) Date of Patent: Jan. 13, 2026

(54) TRAFFIC SCANNING WITH CONTEXT-AWARE THREAT SIGNATURES

(71) Applicant: Sophos Limited, Abingdon (GB)

(72) Inventors: Andrew Thomas, Oxfordshire (GB); Craig Jones, Carmarthen (GB); Michael Shannon, Roberts Creek (CA)

(73) Assignee: Sophos Limited (GB)

( * ) Notice: Subject to any disclaimer, the term of this patent is extended or adjusted under 35 U.S.C. 154(b) by 259 days.

(21) Appl. No.: 17/850,816

(22) Filed: Jun. 27, 2022

(65) Prior Publication Data

US 2023/0421579 A1    Dec. 28, 2023

(51) Int. Cl.
*H04L 9/40* (2022.01)
*G06F 21/56* (2013.01)
*G06F 21/57* (2013.01)

(52) U.S. Cl.
CPC ........ *H04L 63/1416* (2013.01); *G06F 21/564* (2013.01); *H04L 63/14* (2013.01); *H04L 63/1408* (2013.01); *H04L 63/1433* (2013.01); *H04L 63/20* (2013.01); *G06F 21/577* (2013.01)

(58) Field of Classification Search
CPC . H04L 63/1416; H04L 63/14; H04L 63/1408; H04L 63/1433; H04L 63/20; G06F 21/564; G06F 21/577
See application file for complete search history.

(56) References Cited

U.S. PATENT DOCUMENTS

| | | | |
|---|---|---|---|
| 8,892,766 B1* | 11/2014 | Wei | H04L 63/20 706/26 |
| 2008/0289040 A1* | 11/2008 | Ithal | H04L 63/1416 726/23 |
| 2009/0320138 A1 | 12/2009 | Keanini et al. | |
| 2013/0096980 A1* | 4/2013 | Basavapatna | G06Q 10/00 705/7.28 |
| 2014/0331274 A1* | 11/2014 | Bitton | H04L 63/0227 726/1 |
| 2015/0033340 A1 | 1/2015 | Giokas | |
| 2017/0034199 A1 | 2/2017 | Zaw | |
| 2018/0212997 A1 | 7/2018 | Ahuja | |
| 2022/0103592 A1* | 3/2022 | Semel | H04L 63/1416 |

OTHER PUBLICATIONS

Combined Search and Examination Report under Sections 17 & 18(3), GB Application No. GB2309629.0, Dec. 4, 2023, 7 pages.
Examination Report under Section 18(3), GB Application No. GB2309629.0, Jul. 31, 2024, 6 pages.

* cited by examiner

*Primary Examiner* — Cheng-Feng Huang
(74) *Attorney, Agent, or Firm* — Danielson Legal LLC

(57) ABSTRACT

Threat management devices and methods. The methods include receiving, at an interface of a threat management device, contextual data associated with a first endpoint device that is in operable connectivity with the threat management device, wherein the threat management device is configured to execute at least one subsystem to scan network traffic. The methods further include determining at least a first signature from a plurality of signatures to use in scanning the network traffic based on the received contextual data and instructing the at least one subsystem to scan network traffic using at least the first determined signature.

17 Claims, 9 Drawing Sheets

TRAFFIC SCANNING WITH CONTEXT-AWARE THREAT SIGNATURES

TECHNICAL FIELD

The present application relates generally to systems and methods for monitoring network activity for threats and, more particularly but not exclusively, to systems and methods for selecting one or more signatures for scanning network traffic.

BACKGROUND

Security devices may be positioned at various locations on a network such as a local area network (LAN) or wide area network (WAN). For example, one or more Intrusion Prevention Systems (IPS), one or more Intrusion Detection Systems (IDS), or some combination thereof may be positioned between devices such as laptops, desktops, and mobile devices and the Internet. These types of security devices may use one or more signatures for scanning network activity to detect threats on said network matching a signature.

Configuring security devices with signatures can be difficult. A security device may have a limited number of computing resources available (e.g., a specific number of processors, a set amount of Random Access Memory (RAM), and so forth). The security device may use these computing resources in scanning network traffic with one or more of the signatures. As the number of signatures loaded into the security device increases, the amount of computing resources needed to scan network traffic using the signatures may also increase. Accordingly, it is possible that an administrator may over-configure a security device with an excessive number of signatures. An excessive number of signatures may negatively impact the performance of the security device, which may negatively impact the flow of network traffic. Further still, failing to configure the security device with a proper number of signatures (e.g., with an insufficient number of signatures) may cause the security device to miss threats and expose endpoint devices to risk.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

According to one aspect, embodiments relate to a method for operating a threat management device. The method includes receiving, at an interface of a threat management device, contextual data associated with a first endpoint device that is in operable connectivity with the threat management device, wherein the threat management device is configured to execute at least one subsystem to scan network traffic; determining at least a first signature from a plurality of signatures to use in scanning the network traffic based on the received contextual data; and instructing the at least one subsystem to scan network traffic using at least the first determined signature.

In some embodiments, the contextual data includes an operating system type that identifies an operating system being executed by the first endpoint device, and the method further includes identifying a second endpoint device also executing the operating system identified by the operating system type, and scanning network traffic for the first endpoint device and the second endpoint device using the at least one configured subsystem.

In some embodiments, the method further includes issuing a query to the first endpoint device for the contextual data.

In some embodiments, the contextual data is received at the interface at least one of periodically, upon request, when an application is installed on the first endpoint device, or when an application is executed on the first endpoint device.

In some embodiments, the method further includes identifying a second endpoint device, identifying a vulnerability associated with the second endpoint device; and scanning network traffic associated with the second endpoint device using the configured subsystem, wherein the configured subsystem uses at least a second signature for the identified vulnerability. In some embodiments, the second signature is the first signature.

In some embodiments, the contextual data indicates that the first endpoint device lacks vulnerabilities; and the method further comprises allowing network traffic associated with the first endpoint device without scanning the network traffic.

In some embodiments, the at least one subsystem is a first subsystem configured to scan network traffic associated with the first endpoint device in accordance with a first set of rules, the threat management device further comprises a second subsystem configured to scan network traffic associated with a second endpoint device in accordance with a second set of rules, and the method further comprises scanning the network traffic associated with the first endpoint device in accordance with the first set of rules using the first subsystem; and, scanning the network traffic associated with the second endpoint device in accordance with the second set of rules using the second subsystem.

According to another aspect, embodiments relate to a threat management device. The threat management device includes an interface for at least receiving contextual data associated with a first endpoint device that is in operable connectivity with the threat management device; and one or more processors executing instructions stored on memory to determine at least a first signature from a plurality of signatures to use in scanning the network traffic based on the received contextual data, and instruct the at least one subsystem to scan network traffic using at least the first determined signature.

In some embodiments, the contextual data includes an operating system type that identifies an operating system being executed by the first endpoint device, and the threat management device is further configured to identify a second endpoint device also executing the operating system identified by the operating system type and scan network traffic for the first endpoint device and the second endpoint device using the at least one configured subsystem.

In some embodiments, the one or more processors are further configured to issue, via the interface, a query to the first endpoint device for the contextual data.

In some embodiments, the contextual data is received at the interface at least one of periodically, upon request, when an application is installed on the first endpoint device, or when an application is executed on the first endpoint device.

In some embodiments, the threat management device is further configured to identify a second endpoint device, identify a vulnerability associated with the second endpoint device, and scan network traffic associated with the second endpoint device using the configured subsystem, wherein the configured subsystem uses at least a second signature for the identified vulnerability. In some embodiments, the second signature is the first signature.

In some embodiments, the contextual data indicates that the first endpoint device lacks vulnerabilities, and the threat management device is further configured to allow network traffic associated with the first endpoint device without scanning the network traffic.

In some embodiments, the at least one subsystem includes a first subsystem configured to scan network traffic associated with the first endpoint device in accordance with a first set of rules, and a second subsystem that is configured to scan network traffic associated with a second endpoint device in accordance with a second set of rules.

According to yet another aspect, embodiments relate to a computer program product for threat detection. The computer program product comprises computer executable code embodied in one or more non-transitory computer readable media that, when executing on one or more processors, performs the steps of receiving, at an interface of a threat management device, contextual data associated with a first endpoint device that is in operable connectivity with the threat management device, wherein the threat management device is configured to execute at least one subsystem to scan network traffic; determining at least a first signature from a plurality of signatures to use in scanning the network traffic based on the received contextual data; and instructing the at least one subsystem to scan network traffic using at least the first determined signature.

In some embodiments, the contextual data includes an operating system type that identifies an operating system being executed by the first endpoint device, and the computer program product further comprises computer executable code that, when executing on one or more processors, performs the steps of identifying a second endpoint device also executing the operating system identified by the operating system type and scanning network traffic for the first endpoint device and the second endpoint device using the at least one subsystem.

In some embodiments, the at least one subsystem is a first subsystem configured to scan network traffic associated with the first endpoint device in accordance with a first set of rules; the threat management device further comprises a second subsystem configured to scan network traffic associated with a second endpoint device in accordance with a second set of rules, and the computer program product further comprises computer executable code that, when executing on one or more processors, performs the steps of scanning the network traffic associated with the first endpoint device in accordance with the first set of rules using the first subsystem; and scanning the network traffic associated with the second endpoint device in accordance with the second set of rules using the second subsystem. In some embodiments, the second signature is the first signature.

BRIEF DESCRIPTION OF DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
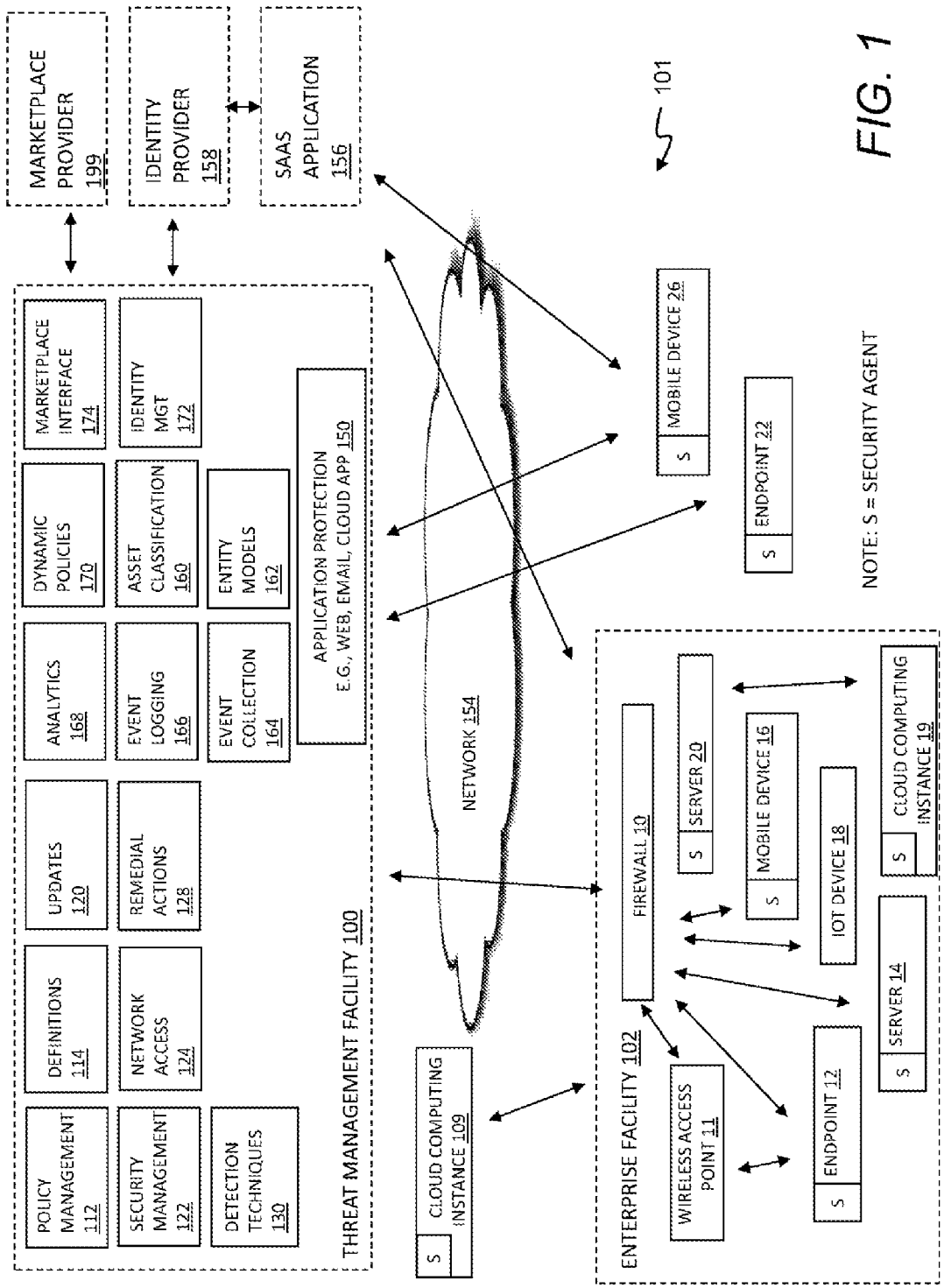
FIG. 1 illustrates a block diagram of a threat management system in accordance with one embodiment.

Various embodiments are described more fully below with reference to the accompanying drawings, which form a part hereof, and which show specific embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

FIG. 1 illustrates a block diagram of a threat management system 101 providing protection against a plurality of threats, such as malware, viruses, spyware, cryptoware, adware, Trojans, spam, intrusion, policy abuse, improper configuration, vulnerabilities, improper access, uncontrolled access, and more. A threat management facility 100 may communicate with, coordinate, and control operation of security functionality at different control points, layers, and levels within the threat management system 101. A number of capabilities may be provided by a threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats. In embodiments, the threat management facility 100 may provide protection from a variety of threats to a variety of compute instances in a variety of locations and network configurations.

As one example, users of the threat management facility 100 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications and data available from servers, applications and data permitted to be accessed by endpoints, and network resources and data permitted to be run and used by endpoints. The threat management facility 100 may provide many different services, and policy management may be offered as one of the services.

Turning to a description of certain capabilities and components of the threat management system 101, the enterprise facility 102 may be or may include any networked computer-based infrastructure. For example, the enterprise facility 102 may be corporate, commercial, organizational, educational, governmental, or the like. As home networks become more complicated and include more compute instances at home and in the cloud, an enterprise facility 102 may also or instead include a personal network such as a home or a group of homes. The enterprise facility's 102 computer network may be distributed amongst a plurality of physical premises such as buildings on a campus, and located in one or in a plurality of geographical locations. The configuration of the enterprise facility as shown is by way of example, and it will be understood that there may be any number of compute instances, less or more of each type of compute instances, and other types of compute instances. As shown, the enterprise facility includes a firewall 10, a wireless access point 11, an endpoint 12, a server 14, a mobile device 16, an appliance or IOT device 18, a cloud computing instance 19, and a server 20. Again, the compute instances 10-20 depicted are meant only as examples, and there may be any number or types of compute instances 10-20 in a given enterprise facility. For example, in addition to the elements depicted in the enterprise facility 102, there may be one or more gateways, bridges, wired networks, wireless networks, virtual private networks, other compute instances, and so on.

The threat management facility 100 may include certain facilities, such as a policy management facility 112, security management facility 122, update facility 120, definitions facility 114, network access facility 124, remedial action facility 128, detection techniques facility 130, application protection 150, asset classification facility 160, entity model facility 162, event collection facility 164, event logging facility 166, analytics facility 168, dynamic policies facility 170, identity management facility 172, and marketplace interface facility 174, as well as other facilities. For example, there may be a testing facility, a threat research facility, and other facilities (not shown). It should be understood that the threat management facility 100 may be implemented in whole or in part on a number of different compute instances, with some parts of the threat management facility on different compute instances in different locations. For example, some or all of one or more of the various facilities 100, 112-174 may be provided as part of a security agent S that is included in software running on a compute instance 10-26 within the enterprise facility 102. Some or all of one or more of the facilities 100, 112-174 may be provided on the same physical hardware or logical resource as a gateway, such as a firewall 10, or wireless access point 11. Some or all of one or more of the facilities 100, 112-174 may be provided on one or more cloud servers that are operated by the enterprise or by a security service provider, such as the cloud computing instance 109.

In embodiments, a marketplace provider 199 may make available one or more additional facilities to the enterprise facility 102 via the threat management facility 100. The marketplace provider 199 may communicate with the threat management facility 100 via the marketplace interface facility 174 to provide additional functionality or capabilities to the threat management facility 100 and compute instances 10-26. As non-limiting examples, the marketplace provider 199 may be a third-party information provider, such as a physical security event provider; the marketplace provider 199 may be a system provider, such as a human resources system provider or a fraud detection system provider; the marketplace provider 199 may be a specialized analytics provider; and so on. The marketplace provider 199, with appropriate permissions and authorization, may receive and send events, observations, inferences, controls, convictions, policy violations, or other information to the threat management facility 100. For example, the marketplace provider 199 may subscribe to and receive certain events, and in response, based on the received events and other events available to the marketplace provider 199, send inferences to the marketplace interface facility 174, and in turn to the analytics facility 168, which in turn may be used by the security management facility 122.

The identity provider 158 may be any remote identity management system or the like configured to communicate with an identity management facility 172, e.g., to confirm identity of a user as well as provide or receive other information about users that may be useful to protect against threats. In general, the identity provider 158 may be any system or entity that creates, maintains, and manages identity information for principals while providing authentication services to relying party applications, e.g., within a federation or distributed network. The identity provider 158 may, for example, offer user authentication as a service, where other applications, such as web applications, outsource the user authentication step(s) to a trusted identity provider.

In embodiments, the identity provider 158 may provide user identity information, such as multi-factor authentication, to a Software-as-a-Service (SaaS) application. Centralized identity providers such as Microsoft Azure, may be used by an enterprise facility instead of maintaining separate identity information for each application or group of applications, and as a centralized point for integrating multifactor authentication. In embodiments, the identity management facility 172 may communicate hygiene, or security risk information, to the identity provider 158. The identity management facility 172 may determine a risk score for a user based on the events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

In embodiments, threat protection provided by the threat management facility 100 may extend beyond the network boundaries of the enterprise facility 102 to include clients (or client facilities) such as an endpoint 22 or other type of computing device outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop or other type of public location. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22 or 26 use a network that is outside of the enterprise facility 102 and separated from the enterprise facility 102, e.g., by a gateway, a public network, and so forth.

In some implementations, compute instances 10-26 may communicate with cloud applications, such as a SaaS application 156. The SaaS application 156 may be an application that is used by but not operated by the enterprise facility 102. Commercially available SaaS applications 156 include Salesforce, Amazon Web Services (AWS) applications, Google Apps applications, Microsoft Office 365 applications and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network or combination thereof.

In embodiments, aspects of the threat management facility 100 may be provided as a stand-alone solution. In other embodiments, aspects of the threat management facility 100 may be integrated into a third-party product. An application programming interface (e.g., a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to the facility 100. Alternatively, the threat management facility 100 may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in a security agent of an endpoint 12, in a wireless access point 11 or firewall 10, as part of application protection 150 provided by the cloud, and so on.

In an embodiment, the security management facility 122 may provide for email security and control, for example to target spam, viruses, spyware and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an embodiment, security management facility 122 may provide for web security and control, for example, to detect or block viruses, spyware, malware, or unwanted applications; help control web browsing; and the like, which may provide comprehensive web access control to enable safe and productive web browsing. Web security and control may provide Internet use policies, reporting on suspect compute instances, security and content filtering, active monitoring of network traffic, Uniform Resource Identifier (URI) filtering, and the like. Aspects of the web security and control may be provided, for example, in the security agent of an endpoint 12, in a wireless access point 11 or firewall 10, as part of application protection 150 provided by the cloud, and so on.

In an embodiment, the security management facility 122 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 100 or other network resource(s).

In an embodiment, the security management facility 122 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

In an embodiment, the security management facility 122 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In embodiments, some reputation information may be stored on a compute instance 10-26, and other reputation data available through cloud lookups to an application protection lookup database, such as may be provided by application protection 150.

In embodiments, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In embodiments, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Rules may include access permissions associated with networks, applications, compute instances, users, content, data, and the like. The policy management facility 112 may use a database, a text file, other data store, or a combination to store policies. In an embodiment, a policy database may include a block list, a black list, an allowed list, a white list, and more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. Policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In an embodiment, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

In embodiments, the threat management facility 100 may provide configuration management as an aspect of the policy management facility 112, the security management facility 122, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of Universal Serial Bus (USB) disks, and the policy management facility 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

In embodiments, the threat management facility 100 may also provide for the isolation or removal of certain applications that are not desired or may interfere with the operation of a compute instance 10-26 or the threat management facility 100, even if such application is not malware per se. The operation of such products may be considered a configuration violation. The removal of such products may be initiated automatically whenever such products are detected, or access.

The policy management facility 112 may also require update management (e.g., as provided by the update facility 120). Update management for the security management facility 122 and policy management facility 112 may be provided directly by the threat management facility 100, or, for example, by a hosted system. In embodiments, the threat management facility 100 may also provide for patch management, where a patch may be an update to an operating system, an application, a system tool, or the like, where one of the reasons for the patch is to reduce vulnerability to threats.

In embodiments, the security management facility 122 and policy management facility 112 may push information to the enterprise facility 102 network and/or the compute instances 10-26, the enterprise facility 102 network and/or compute instances 10-26 may pull information from the security management facility 122 and policy management facility 112, or there may be a combination of pushing and pulling of information. For example, the enterprise facility 102 network and/or compute instances 10-26 may pull update information from the security management facility 122 and policy management facility 112 via the update facility 120, an update request may be based on a time period, by a certain time, by a date, on demand, or the like. In another example, the security management facility 122 and policy management facility 112 may push the information to the enterprise facility's 102 network and/or compute instances 10-26 by providing notification that there are updates available for download and/or transmitting the information. In an embodiment, the policy management facility 112 and the security management facility 122 may work in concert with the update facility 120 to provide information to the enterprise facility's 102 network and/or compute instances 10-26. In various embodiments, policy updates, security updates and other updates may be provided by the same or different modules, which may be the same or separate from a security agent running on one of the compute instances 10-26.

As threats are identified and characterized, the definition facility 114 of the threat management facility 100 may manage definitions used to detect and remediate threats. For example, identity definitions may be used for scanning files, applications, data streams, etc. for the determination of malicious code. Identity definitions may include instructions and data that can be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 100 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need to know, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-22 should be granted access to a requested network location, e.g., inside or outside of the enterprise facility 102. Network access facility 124 may determine if a compute instance 22, 26 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent of the endpoint 12, in a wireless access point 11, in a firewall 10, as part of application protection 150 provided by the cloud, and so on.

In an embodiment, the network access facility 124 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 124 may use rule evaluation to parse network access requests and apply policies. The network access facility 124 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, MacOS, Linux, Android, iOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility 100 may include the entity model facility 162. The entity models may be used, for example, to determine the events that are generated by assets. For example, some operating systems may provide useful information for detecting or identifying events. For examples, operating systems may provide process and usage information that accessed through an API. As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. An event may be communication of a specific packet over the network. Another event may be identification of an application that is communicating over a network.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility Observations or inferences about events may also be logged by the event logging facility 166.

When a threat or other policy violation is detected by the security management facility 122, the remedial action facility 128 may remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 128 may take any steps or deploy any measures suitable for addressing a detection of a threat, potential threat, policy violation or other event, code or activity that might compromise security of a computing instance 10-26 or the enterprise facility 102.

Figure 2:
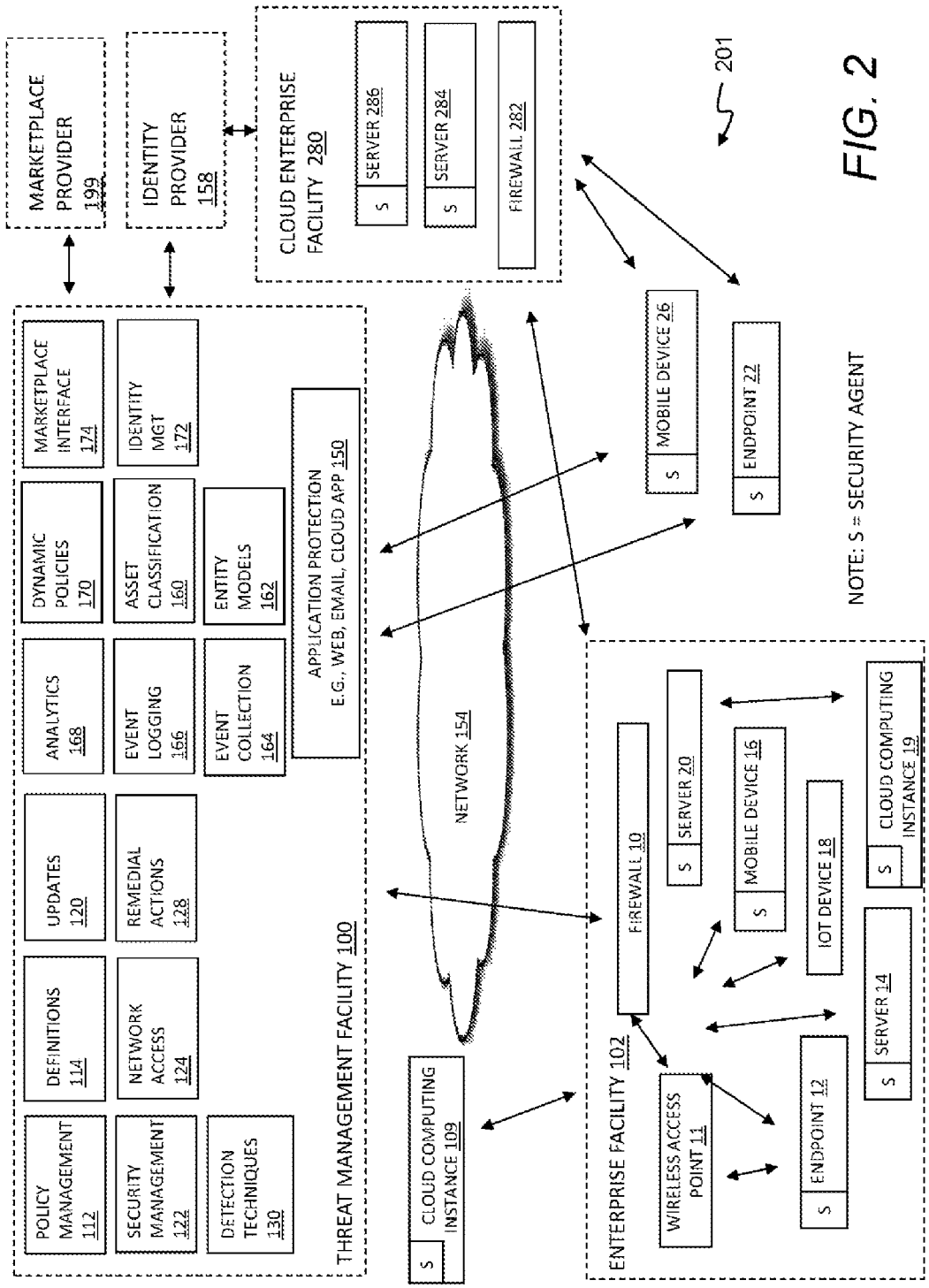
FIG. 2 illustrates a block diagram of a threat management system in accordance with another embodiment.

FIG. 2 illustrates a block diagram of a threat management system 201 such as any of the threat management systems described herein, and including a cloud enterprise facility 280. The cloud enterprise facility 280 may include servers 284, 286, and a firewall 282. The servers 284, 286 on the cloud enterprise facility 280 may run one or more enterprise applications and make them available to the enterprise facilities 102 or compute instances 10-26. It should be understood that there may be any number of servers 284, 286 and firewalls 282, as well as other compute instances in a given cloud enterprise facility 280. It also should be understood that a given enterprise facility may use both SaaS applications 156 and cloud enterprise facilities 280, or, for example, a SaaS application 156 may be deployed on a cloud enterprise facility 280. As such, the configurations in FIG. 1 and FIG. 2 are shown by way of examples and not exclusive alternatives.

Figure 3:
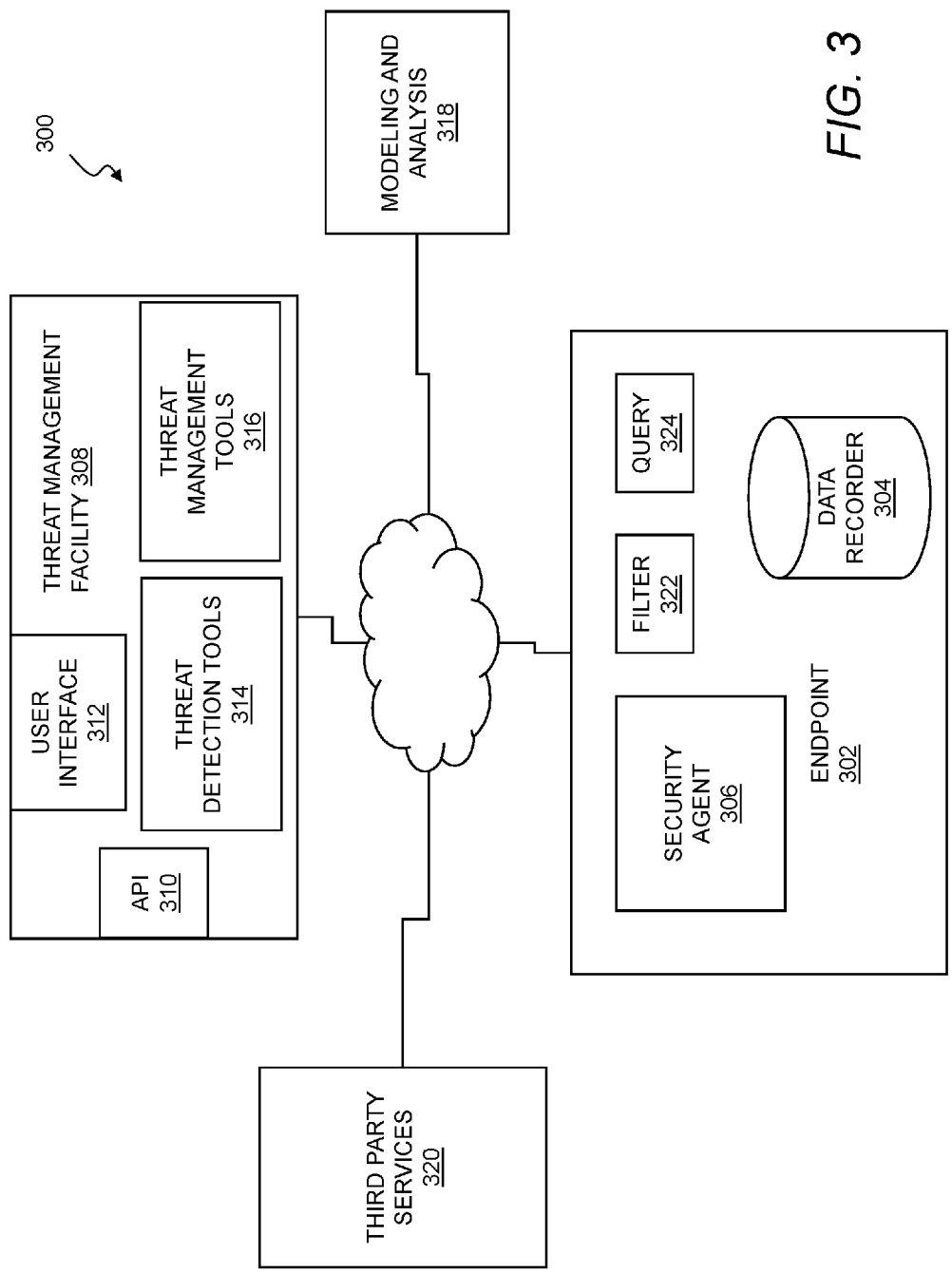
FIG. 3 illustrates a system for enterprise network threat detection in accordance with one embodiment.

FIG. 3 shows a system 300 for enterprise network threat detection in accordance with one embodiment. The system 300 may use any of the various tools and techniques for threat management contemplated herein. In the system 300, a number of endpoints or computing devices such as the endpoint 302 may log events in a data recorder 304. A local agent on the endpoint 302 such as the security agent 306 may filter this data and feed a filtered data stream to a threat management facility 308 such as a central threat management facility or any of the other threat management facilities described herein. The threat management facility 308 can locally or globally tune filtering by local agents based on the current data stream, and can query local event data recorders for additional information where necessary or helpful in threat detection or forensic analysis. The threat management facility 308 may also or instead store and deploy a number of security tools such as a web-based user interface that is supported by machine learning models to aid in the identification and assessment of potential threats by a human user. This may, for example, include machine learning analysis of new code samples, models to provide human-readable context for evaluating potential threats, and any of the other tools or techniques described herein. More generally, the threat management facility 308 may provide any of a variety of threat management tools 316 to aid in the detection, evaluation, and remediation of threats or potential threats.

The threat management facility 308 may perform a range of threat management functions such as any of those described herein. The threat management facility 308 may generally include an application programming interface 310 to third party services 320, a user interface 312 for access to threat management and network administration functions, and a number of threat detection tools 314.

In general, the application programming interface 310 may support programmatic connections with third party services 320. The application programming interface 310 may, for example, connect to an Active Directory or other customer information about files, data storage, identities and user profiles, roles, access privileges and so forth. More generally the application programming interface 310 may provide a programmatic interface for customer or other third-party context, information, administration and security tools, and so forth. The application programming interface 310 may also or instead provide a programmatic interface for hosted applications, identity provider integration tools or services, and so forth.

The user interface 312 may include a web site or other graphical interface or the like, and may generally provide an interface for user interaction with the threat management facility 308, e.g., for threat detection, network administration, audit, configuration and so forth. This user interface 312 may generally facilitate human curation of intermediate threats as contemplated herein, e.g., by presenting intermediate threats along with other supplemental information, and providing controls for user to dispose of such intermediate threats as desired, e.g., by permitting execution or access, by denying execution or access, or by engaging in remedial measures such as sandboxing, quarantining, vaccinating, and so forth.

The threat detection tools 314 may be any of the threat detection tools, algorithms, techniques or the like described herein, or any other tools or the like useful for detecting threats or potential threats within an enterprise network. This may, for example, include signature-based tools, behavioral tools, machine learning models, and so forth. In general, the threat detection tools 314 may use event data provided by endpoints within the enterprise network, as well as any other available context such as network activity, heartbeats, and so forth to detect malicious software or potentially unsafe conditions for a network or endpoints connected to the network. In one aspect, the threat detection tools 314 may usefully integrate event data from a number of endpoints (including, e.g., network components such as gateways, routers and firewalls) for improved threat detection in the context of complex or distributed threats. The threat detection tools 314 may also or instead include tools for reporting to a separate modeling and analysis platform 318, e.g., to support further investigation of security issues, creation or refinement of threat detection models or algorithms, review and analysis of security breaches and so forth.

The threat management tools 316 may generally be used to manage or remediate threats to the enterprise network that have been identified with the threat detection tools 314 or otherwise. Threat management tools 316 may, for example, include tools for sandboxing, quarantining, removing, or otherwise remediating or managing malicious code or malicious activity, e.g., using any of the techniques described herein.

The endpoint 302 may be any of the endpoints or other compute instances or devices the like described herein. This may, for example, include end-user computing devices, mobile devices, firewalls, gateways, servers, routers and any other computing devices or instances that might connect to an enterprise network. As described above, the endpoint 302 may generally include a security agent 306 that locally supports threat management on the endpoint 302, such as by monitoring for malicious activity, managing security components on the endpoint 302, maintaining policy compliance, and communicating with the threat management facility 308 to support integrated security protection as contemplated herein. The security agent 306 may, for example, coordinate instrumentation of the endpoint 302 to detect various event types involving various computing objects on the endpoint 302, and supervise logging of events in a data recorder 304. The security agent 306 may also or instead scan computing objects such as electronic communications or files, monitor behavior of computing objects such as executables, and so forth. The security agent 306 may, for example, apply signature-based or behavioral threat detection techniques, machine learning models (e.g. models developed by the modeling and analysis platform), or any other tools or the like suitable for detecting malware or potential malware on the endpoint 302.

The data recorder 304 may log events occurring on or related to the endpoint 302. This may, for example, include events associated with computing objects on the endpoint 302 such as file manipulations, software installations, and so forth. This may also or instead include activities directed from the endpoint 302, such as requests for content from Uniform Resource Locators or other network activity involving remote resources. The data recorder 304 may record data at any frequency and any level of granularity consistent with proper operation of the endpoint 302 in an intended or desired manner.

The endpoint 302 may include a filter 322 to manage a flow of information from the data recorder 304 to a remote resource such as the threat detection tools 314 of the threat management facility 308. In this manner, a detailed log of events may be maintained locally on each endpoint, while network resources can be conserved for reporting of a filtered event stream that contains information believed to be most relevant to threat detection. The filter 322 may also or instead be configured to report causal information that causally relates collections of events to one another. In general, the filter 322 may be configurable so that, for example, the threat management facility 308 can increase or decrease the level of reporting based on a current security status of the endpoint, a group of endpoints, the enterprise network and the like. The level of reporting may also or instead be based on currently available network and computing resources, or any other appropriate context.

In another aspect, the endpoint 302 may include a query interface 324 so that remote resources such as the threat management facility 308 can query the data recorder 304 remotely for additional information. This may include a request for specific events, activity for specific computing objects, or events over a specific time frame, or some combination of these. Thus for example, the threat management facility 308 may request all changes to the registry of system information for the past forty eight hours, all files opened by system processes in the past day, all network connections or network communications within the past hour, or any other parametrized request for activities monitored by the data recorder 304. In another aspect, the entire data log, or the entire log over some predetermined window of time, may be requested for further analysis at a remote resource.

It will be appreciated that communications among third party services 320, the threat management facility 308, and one or more endpoints such as the endpoint 302 may be facilitated by using consistent naming conventions across products and machines. For example, the system 300 may usefully implement globally unique device identifiers, user identifiers, application identifiers, data identifiers, Uniform Resource Locators, network flows, and files. The system may also or instead use tuples to uniquely identify communications or network connections based on, e.g., source and destination addresses and so forth.

According to the foregoing, a system disclosed herein includes an enterprise network, an endpoint 302 coupled to the enterprise network, and a threat management facility 308 coupled in a communicating relationship with the endpoint 302 and a plurality of other endpoints $302^N$ through the enterprise network. The endpoint 302 may have a data recorder 304 that stores an event stream of event data for computing objects, a filter 322 for creating a filtered event stream with a subset of event data from the event stream, and a query interface 324 for receiving queries to the data recorder 304 from a remote resource, the endpoint 302 further including a local security agent 306 configured to detect malware on the endpoint 302 based on event data stored by the data recorder 304, and further configured to communicate the filtered event stream over the enterprise network. The threat management facility 308 may be configured to receive the filtered event stream from the endpoint 302, detect malware on the endpoint 302 based on the filtered event stream, and remediate the endpoint 302 when malware is detected, the threat management facility 308 further configured to modify security functions within the enterprise network based on a security state of the endpoint 302.

The threat management facility 308 may be configured to adjust the reporting of event data through the filter 322 in response to a change in the filtered event stream received from the endpoint 302. The threat management facility 308 may be configured to adjust the reporting of event data through the filter 322 when the filtered event stream indicates a compromised security state of the endpoint 302. The threat management facility 308 may be configured to adjust reporting of event data from one or more other endpoints 302 in response to a change in the filtered event stream received from the endpoint 302. The threat management facility 308 may be configured to adjust reporting of event data through the filter 322 when the filtered event stream indicates a compromised security state of the endpoint 302. The threat management facility 308 may be configured to request additional data from the data recorder 304 when the filtered event stream indicates a compromised security state of the endpoint 302. The threat management facility 308 may be configured to request additional data from the data recorder 304 when a security agent 306 of the endpoint 302 reports a security compromise independently from the filtered event stream. The threat management facility 308 may be configured to adjust handling of network traffic at a gateway to the enterprise network in response to a predetermined change in the filtered event stream. The threat management facility 308 may include a machine learning model for identifying potentially malicious activity on the endpoint 302 based on the filtered event stream. The threat management facility 308 may be configured to detect potentially malicious activity based on a plurality of filtered event streams from a plurality of endpoints $302^N$. The threat management facility 308 may be configured to detect malware on the endpoint 302 based on the filtered event stream and additional context for the endpoint 302.

The data recorder 304 may record one or more events from a kernel driver. The data recorder 304 may record at least one change to a registry of system settings for the endpoint 302. The endpoints $302^N$ may include a server, a firewall for the enterprise network, a gateway for the enterprise network, or any combination of these. The endpoint 302 may be coupled to the enterprise network through a virtual private network or a wireless network. The endpoint 302 may be configured to periodically transmit a snapshot of aggregated, unfiltered data from the data recorder 304 to the threat management facility 308 for remote storage. The data recorder 304 may be configured to delete records in the data recorder 304 corresponding to the snapshot in order to free memory on the endpoint 302 for additional recording.

The endpoint 302 may be configured with or otherwise be in operable communication with a firewall device (not shown) configured to receive signatures for scanning network activity. The endpoint 302 may receive a plurality of threat signatures, with some or all of the received signatures selected for loading into RAM for scanning network activity.

Figure 4:
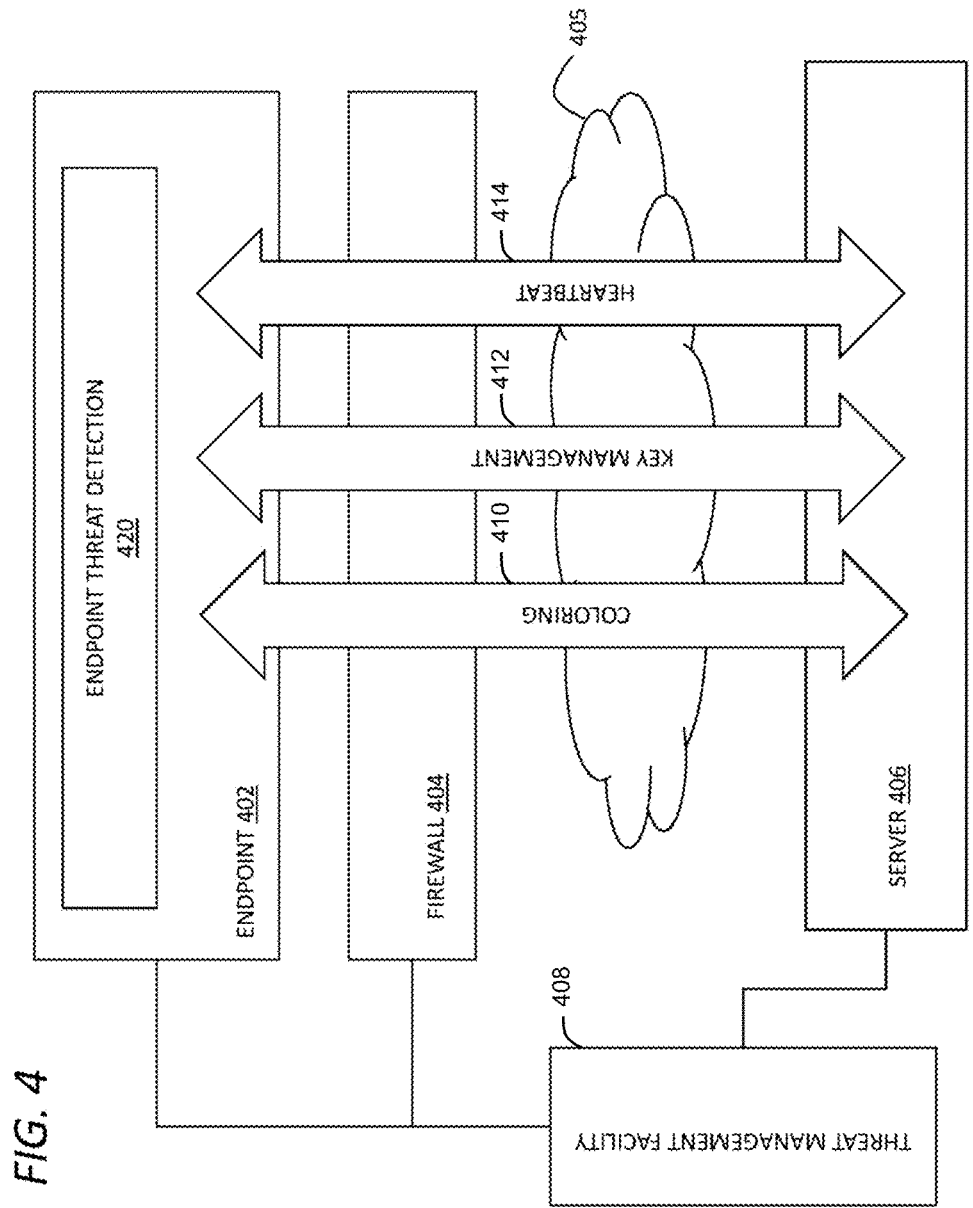
FIG. 4 illustrates a threat management system in accordance with another embodiment.

FIG. 4 illustrates a threat management system in accordance with another embodiment. In general, the system may include an endpoint 402, a firewall 404, a server 406, and a threat management facility 408 coupled to one another directly or indirectly through a data network 405, all as generally described above. Each of the entities depicted in FIG. 4 may, for example, be implemented on one or more computing devices such as the computing device described herein. A number of systems may be distributed across these various components to support threat detection, such as a coloring system 410, a key management system 412 and a heartbeat system 414, each of which may include software components executing on any of the foregoing system components, and each of which may communicate with the threat management facility 408 and an endpoint threat detection agent 420 executing on the endpoint 402 to support improved threat detection and remediation.

The coloring system 410 may be used to label or color software objects for improved tracking and detection of potentially harmful activity. The coloring system 410 may, for example, label files, executables, processes, network communications, data sources and so forth with any suitable information. A variety of techniques may be used to select static and/or dynamic labels for any of these various software objects, and to manage the mechanics of applying and propagating coloring information as appropriate. For example, a process may inherit a color from an application that launches the process. Similarly, a file may inherit a color from a process when it is created or opened by a process, and/or a process may inherit a color from a file that the process has opened. More generally, any type of labeling, as well as rules for propagating, inheriting, changing, or otherwise manipulating such labels, may be used by the coloring system 410 as contemplated herein.

The key management system 412 may support management of keys for the endpoint 402 in order to selectively permit or prevent access to content on the endpoint 402 on a file-specific basis, a process-specific basis, an application-specific basis, a user-specific basis, or any other suitable basis in order to prevent data leakage, and in order to support more fine-grained and immediate control over access to content on the endpoint 402 when a security compromise is detected. Thus, for example, if a particular process executing on the endpoint is compromised, or potentially compromised or otherwise under suspicion, keys to that process may be revoked in order to prevent, e.g., data leakage or other malicious activity.

The heartbeat system 414 may be used to provide periodic or aperiodic information from the endpoint 402 or other system components about system health, security, status, and so forth. A heartbeat may be encrypted or plaintext, or some combination of these, and may be communicated unidirectionally (e.g., from the endpoint 402 to the threat management facility 408) or bidirectionally (e.g., between the endpoint 402 and the server 406, or any other pair of system components) on any useful schedule.

In general, these various monitoring and management systems may cooperate to provide improved threat detection and response. For example, the coloring system 410 may be used to evaluate when a particular process is potentially opening inappropriate files based on an inconsistency or mismatch in colors, and a potential threat may be confirmed based on an interrupted heartbeat from the heartbeat system 414. The key management system 412 may then be deployed to revoke keys to the process so that no further files can be opened, deleted or otherwise modified. More generally, the cooperation of these systems enables a wide variety of reactive measures that can improve detection and remediation of potential threats to an endpoint.

As discussed previously, network administrators may inadvertently or unknowingly over-configure a threat management device with, for example, an excessive number of signatures or cause the device to execute an excessive amount of configuration rules. This over-configuration may degrade network performance, device performance, or both.

An excess number of signatures may also lead to false positives. With more signatures, a threat management device may be more likely to detect a match between a loaded signature and a pattern in network traffic. However, some matches may indicate only a negligible threat. In these cases, an administrator may at the very least be inconvenienced by an unnecessary alert.

On the other hand, an administrator may under-configure a threat management device with not enough signatures. A threat management device may then overlook or otherwise miss threats in network activity. These missed threats may compromise the security of endpoint devices.

Embodiments herein provide systems and methods that consider contextual data associated with one or more endpoint devices on a network. Based on the contextual data, a threat management device may determine one or more signatures that an IPS/IDS subsystem should use for scanning network traffic associated with the endpoint device(s). The threat management device may then use the determined one or more signatures for scanning incoming network traffic associated with the endpoint device, outgoing network traffic associated with the endpoint device, or both.

Different threat management devices may have different signatures enabled and be better suited than other devices to scan certain traffic. Accordingly, the embodiments herein may also direct network traffic to different threat management devices or subsystems thereof, reducing the possibility that any one threat management device will be overloaded with network traffic. The embodiments herein provide improvements in network security and threat management devices, as subsystems thereof are configured with specific signatures based on contextual data associated with endpoint devices.

Figure 5:
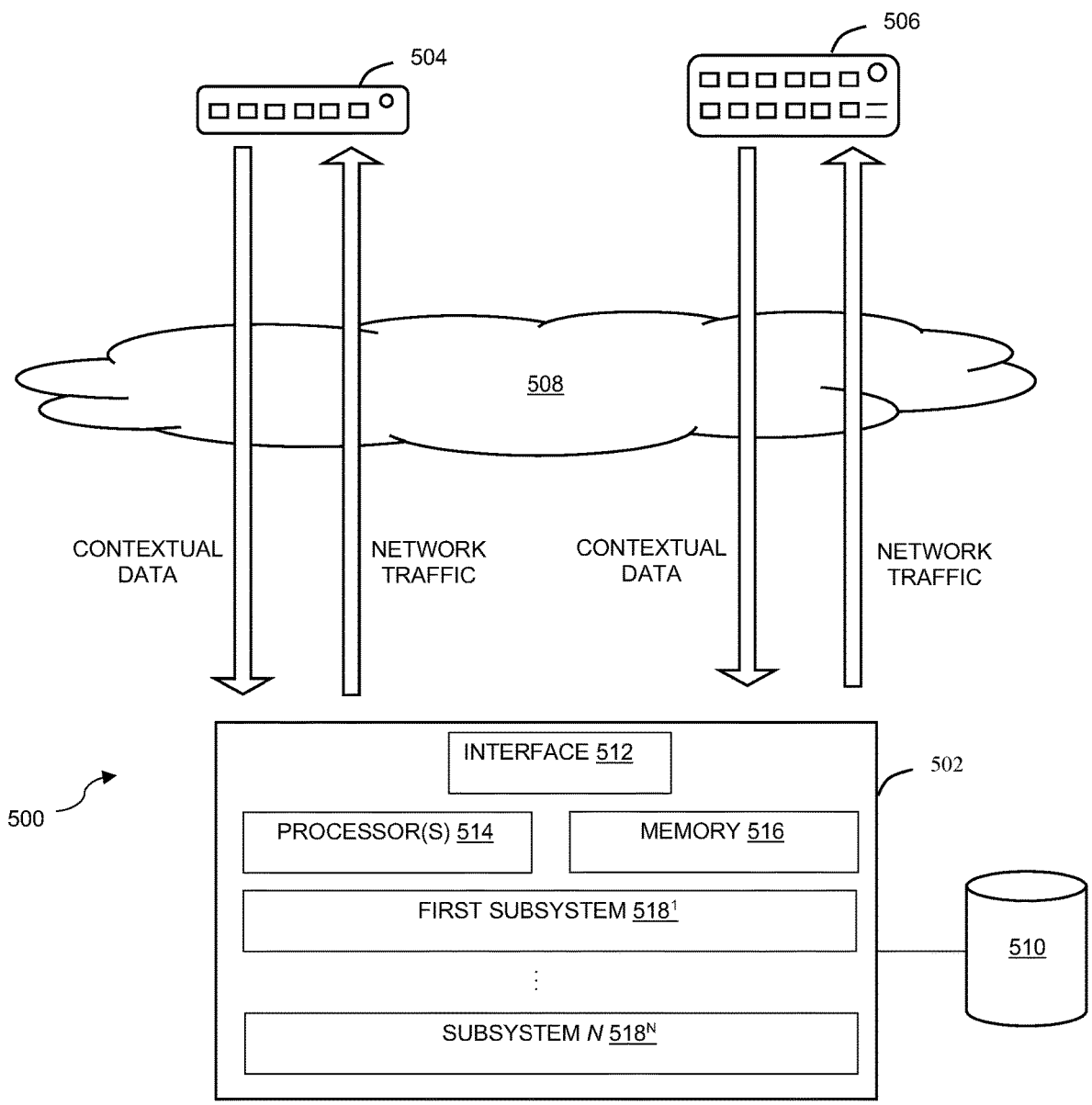
FIG. 5 illustrates a system for scanning network traffic in accordance with one embodiment.

FIG. 5 illustrates a system 500 for scanning network traffic in accordance with one embodiment. The system 500 may include one or more threat management devices 502 in communication with a first endpoint device 504 and a second endpoint device 506 over one or more networks 508. The threat management device 502 may also be in communication with one or more databases 510 storing configuration rules, threat signatures, etc. Although two endpoint devices 504 and 506 are shown, the system 500 may include more than or less than two endpoint devices.

The network(s) 508 may link the various components with various types of network connections. The network(s) 508 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network or networks 508 may also comprise, include, or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link.

The threat management device 502 may include an interface 512 for at least receiving contextual data from the endpoint devices 504, 506. The threat management device 502 may also include one or more processors 514 executing instructions stored on memory 516 to provide one or more sub systems $518^N$.

The one or more processors 514 may be any hardware device capable of executing instructions stored on memory 516 to provide various subsystems, components, or modules. The processor(s) 514 may include a microprocessor, a field programmable gate array (FPGA), an application-specific integrated circuit (ASIC), or other similar devices.

In some embodiments, such as those relying on one or more ASICs, the functionality described as being provided in part via software may instead be configured into the design of the ASICs and, as such, the associated software may be omitted. The processor(s) 514 may be configured as part of the threat management device 502, a user device, or located at some remote location.

The memory 516 may be L1, L2, L3 cache, or RAM memory configurations. The memory 516 may include non-volatile memory such as flash memory, EPROM, EEPROM, ROM, and PROM, or volatile memory such as static or dynamic RAM, as discussed above. The exact configuration/type of memory 516 may of course vary as long as instructions for operating the threat management device 502 may be executed.

An administrator may install one or more endpoint agents on an endpoint device 504, 506. An administrator may simultaneously or subsequently configure or otherwise install one or more IDS/IPS subsystems $518^N$ on the threat management device 502.

In operation, the endpoint devices 504, 506 may each execute its agent(s) to gather, process, and communicate contextual data regarding the endpoint device. The contextual data may include static data such as the type of operating system executed by the endpoint device, operating system patch level, a listing of one or more applications installed on the endpoint device, a listing of applications and versions of applications installed on the endpoint device, or the like. This type of contextual data is considered "static" as it generally does not change often. Other types of static contextual data, whether available now or invented hereafter, and in addition to or in lieu of the data above may be considered to accomplish the objectives of the embodiments herein.

The contextual data may additionally or alternatively include dynamic data such as, for example, a process or application currently executing on an endpoint device, the name of a process or application an endpoint is about to execute, whether one or more of executed applications have network access, whether a currently-launched application performs a network access attempt, or the like. This type of contextual data is considered "dynamic" as it tends to change frequently. Other types of dynamic contextual data, whether available now or invented hereafter, and in addition to or in lieu of the data above may be considered to accomplish the objectives of the embodiments herein.

The agent(s) executing on an endpoint device 504, 506 may be configured to communicate contextual data about its associated endpoint device in accordance with different schedules or conditions. For example, an agent may communicate contextual data to the threat management device 502 at predetermined time intervals, such as at the end of each day. In other embodiments, an agent may communicate contextual data upon receiving a request. For example, the threat management device 502 may issue a query to an endpoint device 504, 506 for contextual data.

In some embodiments, the endpoint devices 504, 506 may be configured with a heartbeat system to provide the contextual data. These heartbeat system(s) may be similar to the heartbeat system 414 of FIG. 4 discussed above, for example.

The threat management device 502 may consult one or more databases 510 for various configuration parameters associated with each endpoint device 504, 506 based on information already possessed by the threat management device 502 or contextual information received from endpoint 504, 506. For example, each individual endpoint device or subnet of endpoint devices may be governed by certain firewall rules.

Similarly, the threat management device 502 may use the received contextual information to determine which firewall rules correspond to the software services executing on endpoint devices 504, 506. As discussed above, the firewall rules applicable to a particular endpoint device may depend on the type of endpoint device, operating system executed by the endpoint device, computing devices associated with the endpoint device, subnet on which the endpoint device is located, or the like, all of which may be conveyed as contextual information or, e.g., determined from configuration parameters previously stored in database 510. The threat management device 502 may also configure firewall rules for services, ports, and operating systems it is tasked with protecting.

In some embodiments, an endpoint agent may report to the threat management device 502 that a new endpoint device (not shown) has been added to the network 508. For example, an agent may report that an endpoint device running a Linux-based operating system or TOMCAT®, available from the Apache Software Foundation, has been added to a network.

The agent reporting this addition may be installed on a pre-existing endpoint device 504, 506 or with the newly-added endpoint device (not shown). Depending on the endpoint device added, the threat management device 502 or a subsystem thereof may already have been configured with appropriate signatures and rules for the new endpoint device. Accordingly, the threat management device may direct traffic for that new endpoint device through that configured subsystem.

FIGS. 6A-D illustrate a process for operating a threat management device 600 in accordance with one embodiment. The threat management device 600 of FIGS. 6A-D may be similar to the threat management device 502 of FIG. 5, and may be in contact with a first endpoint device 602 and a second endpoint device 604. As seen in FIGS. 6A-D the threat management device 600 may include at least a first subsystem 606 and a second subsystem 608. Although two subsystems are shown in FIGS. 6A-D, the threat management devices described herein may include any number of subsystems as illustrated in FIG. 5, including only one subsystem.

Figure 6A:
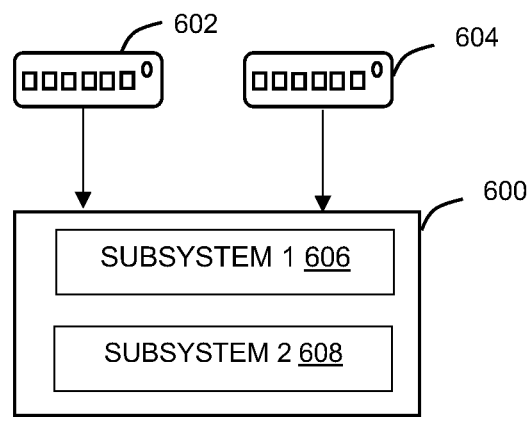
FIGS. 6A-D illustrate a process for operating a threat management device in accordance with one embodiment.

FIG. 6A illustrates the endpoint devices 602, 604 communicating contextual data to the threat management device 600. The contextual data may include static and dynamic data as discussed previously. The endpoint devices 602, 604 may communicate the contextual data under certain conditions, e.g., in accordance with a schedule, upon receiving a request from the threat management device 600, or some combination thereof.

Figure 6B:
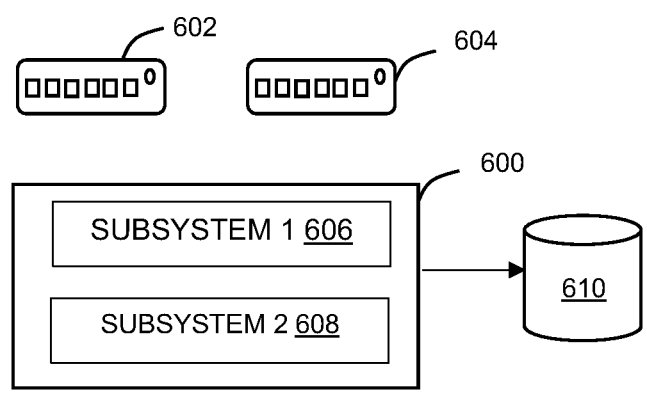

FIG. 6B illustrates the threat management device 600 referencing one or more configuration rules in one or more databases 610 using the received contextual data and potentially other information, such as pre-stored configuration parameters. The configuration rules may refer to firewall rules for certain ports, applications, operating systems, or the like. Although FIG. 6B illustrates the threat management device 600 referencing the database 610, such as at a geographic location different than the threat management device 600, the configuration rules may be retrieved from and referenced at any geographic location.

Figure 6C:
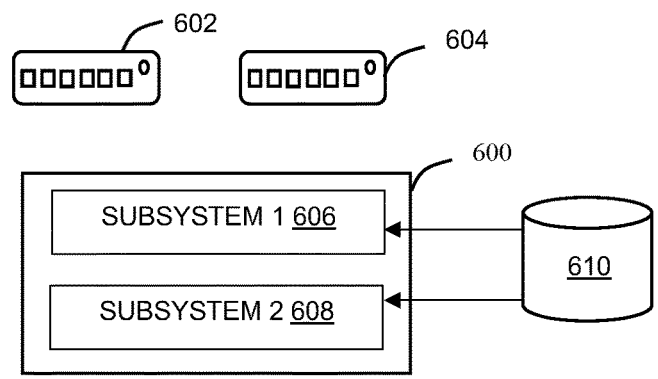

FIG. 6C illustrates one or more signatures being communicated to and loaded into the first subsystem 606 and the second subsystem 608. The signature(s) loaded into each subsystem may be a function of the contextual data associated with each of the endpoint devices. Although the signatures are illustrated as being communicated from the database 610, the signatures may be retrieved from any suitable location. The signatures may be loaded into RAM associated with each of the subsystems 606 and 608.

Figure 6D:
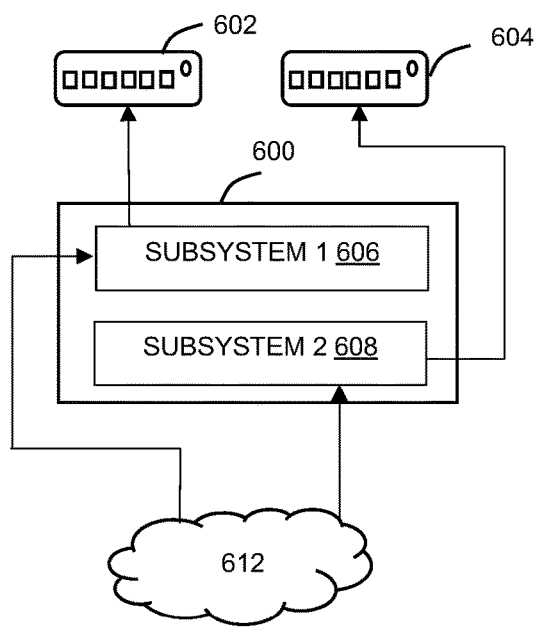

FIG. 6D illustrates the threat management device 600 directing traffic from a network 612 to the first endpoint device 602 and to the second endpoint device 604. In this scenario, the first subsystem 606 may be associated with the first endpoint device 602 and the second subsystem 608 may be associated with the second endpoint device 604. For example, the signature(s) loaded in the first subsystem 606 may have been specifically chosen based on a vulnerability associated with the first endpoint device 602 as determined by the contextual data associated with the first endpoint device 602. The signature(s) loaded in the second subsystem 608 may have been specifically chosen based on a vulnerability associated with the second endpoint device 604, as determined by the contextual data associated with the second endpoint device 604.

In some embodiments, a single subsystem may be associated with multiple endpoint devices based on the endpoint devices being similarly configured. For example, if contextual data indicates that two endpoint devices are executing the same type of operating system, then a subsystem may use the same signatures for scanning network traffic associated with both endpoint devices.

Figure 7:
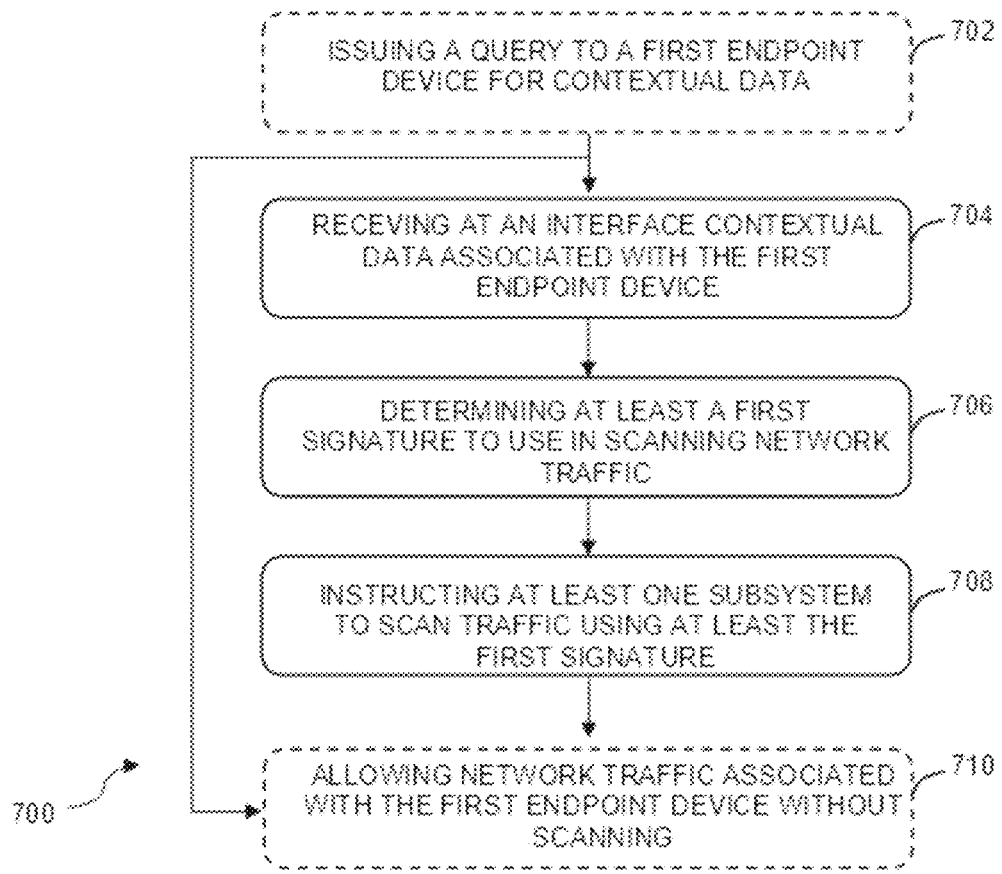
FIG. 7 depicts a flowchart of a method for operating a threat management device in accordance with one embodiment.

FIG. 7 depicts a flowchart of a method 700 for operating a threat management device in accordance with one embodiment. The systems or components of any one of FIGS. 1-6 may perform the steps of method 700.

Step 702 involves issuing a query to a first endpoint device for contextual data. Step 702 may be optional, in that a threat management device or other device may not issue a query, nor may an endpoint device receive a query. For example, and as discussed above, an endpoint device or agent executing thereon may communicate contextual data to a threat management device in accordance with a schedule or under certain condition(s).

Step 704 involves receiving, at an interface of a threat management device, contextual data associated with a first endpoint device that is in operable connectivity with the threat management device. In accordance with some embodiments, the threat management device is configured to execute at least one subsystem to scan network traffic as described in conjunction with FIGS. 5 and 6A-D. The at least one subsystem may be an IPS/IDS system, for example, and tasked with scanning traffic to an endpoint device, from an endpoint device, or both.

Step 706 involves determining at least a first signature from a plurality of signatures to use in scanning the network traffic based on the received contextual data. The threat management device may be in operable communication with one or more databases or storages of threat signatures. The threat management device may load one or more particular signatures into a subsystem for scanning. The signatures loaded may be based on the contextual data, such that the subsystem uses appropriate signature(s) for traffic associated with a particular endpoint device.

Step 708 involves instructing the at least one subsystem to scan network traffic using at least the first determined signature. The subsystem may then use the loaded determined signature for scanning traffic associated with the endpoint device.

In some embodiments, contextual data may indicate that the first endpoint device lacks vulnerabilities. For example, the contextual data may indicate that the operating system executed by the first endpoint device is updated, vulnerabilities are patched, or the like. In these scenarios, method 700 may proceed to step 710, which involves allowing network traffic associated with the first endpoint device without scanning.

The threat management devices in accordance with the embodiments herein may also be configured with remediation tools such as the threat management tools 316 of FIG. 3 described previously. Accordingly, the embodiments herein may perform any appropriate remediation steps or techniques upon detecting a match between a signature and a pattern in network traffic.

Figure 8:
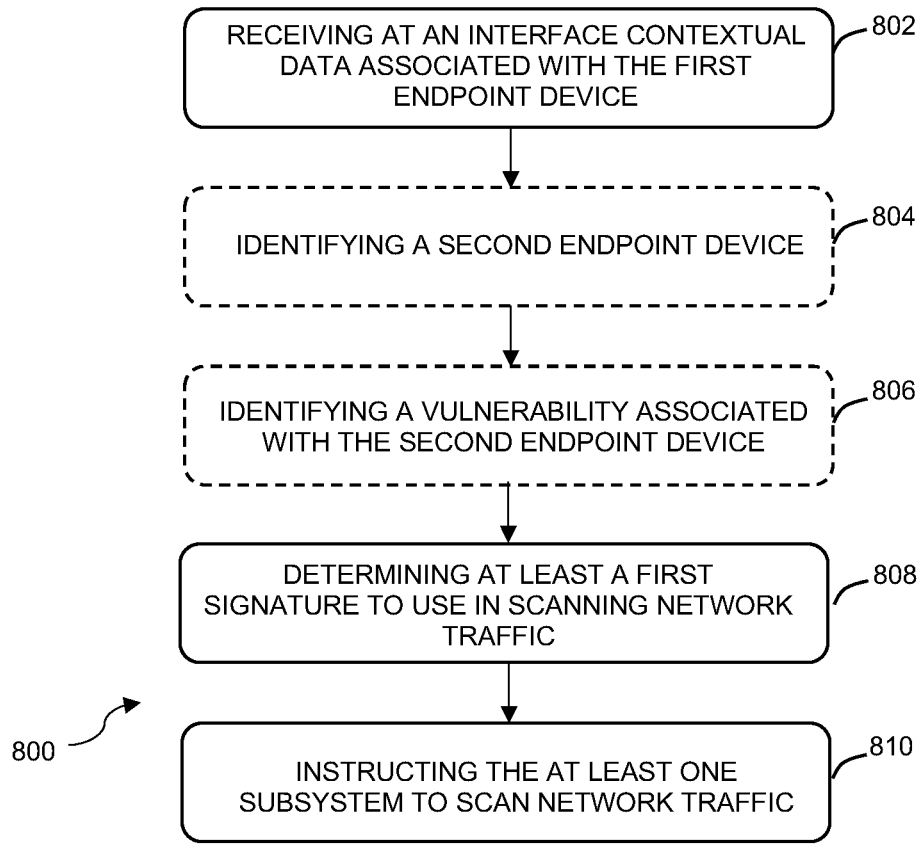
FIG. 8 depicts a flowchart of a method for operating a threat management device in accordance with another embodiment.

FIG. 8 depicts a flowchart of a method 800 for operating a threat management device in accordance with another embodiment. The systems or components of any one of FIGS. 1-6 may perform the steps of method 800.

Step 802 involves receiving, at an interface of a threat management device, contextual data associated with a first endpoint device that is in operable connectivity with the threat management device. The threat management device may be configured to execute at least one subsystem to scan network traffic. Step 802 may be similar to step 704 of FIG. 7 discussed previously.

Step 804 involves identifying a second endpoint device. There may be multiple endpoint devices on or otherwise accessible over a network. The second endpoint device may be similarly or differently configured than the first endpoint device. For example, the second endpoint device may be part of the same subnet as the first endpoint device.

Step 806 involves identifying a vulnerability associated with the second endpoint device. The contextual data associated with the second endpoint device may indicate that the second endpoint device may have a vulnerability, such as being associated with a vulnerable application or library. For example, the second endpoint device may be using a library that is known to be vulnerable or outdated.

Step 808 involves determining at least a first signature from a plurality of signatures to use in scanning the network traffic based on the received contextual data. Step 808 may be similar to step 706 of FIG. 7 discussed previously. However, step 808 may also involve determining a second signature for use by the second endpoint device in scanning network traffic. In some embodiments, the first and second signatures are the same signature. In other embodiments, the first and second signatures are different signatures.

Step 810 involves instructing the at least one subsystem to scan network traffic using at least the first determined signature. For example, a first subsystem on or associated with the threat management device may use at least the first signature for scanning network traffic associated with the first endpoint device, and a second subsystem on or associated with the threat management device may use the second signature for scanning network traffic associated with the second endpoint device.

In this regard, the foregoing systems and methods provide a technological advancement over device management configuration and deployment within a threat management system. As a threat management device may have limited resources available for managing a plurality of threat signatures, intelligently selecting which threat signatures to use in scanning an endpoint device represents an improvement in prior device management techniques. Further still, the threat management device may exhibit improved performance over a prior deployment as the threat management device may be properly configured with the appropriate threat signatures based on contextual data received from one or more endpoint devices. As contextual data associated with an endpoint device changes, the threat management device may similarly change which signatures are selected to continuously use the most appropriate signatures for the endpoint device. These and other improvements described herein provide a benefit to various actors and/or systems within a threat management facility.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for operating a threat management device, the method comprising:
    receiving, at an interface of a threat management device, first contextual data associated with a first endpoint device that is in operable connectivity with the threat management device, wherein the threat management device is configured to execute a first subsystem;
    receiving, at the interface of the threat management device, second contextual data associated with a second endpoint device that is different than the first endpoint device and in operable connectivity with the threat management device, wherein the threat management device is further configured to execute a second subsystem;
    analyzing the first contextual data associated with the first endpoint device to determine at least a first signature from the plurality of signatures;
    scanning, using the first subsystem, network traffic associated with the first endpoint device using the first signature;
    analyzing the second contextual data associated with the second endpoint device; and
    allowing network traffic associated with the second endpoint device without scanning based on the analysis of the second contextual data indicating at least one of that an operating system executed by the second endpoint device is updated or that vulnerabilities are patched,
    wherein the second endpoint device is part of a same subnet of a network as the first endpoint device.

2. The method of claim 1, wherein the first contextual data includes an operating system type that identifies an operating system associated with the first endpoint device.

3. The method of claim 1, further comprising issuing a query to the first endpoint device for the first contextual data associated with the first endpoint device.

4. The method of claim 1, wherein the first contextual data associated with the first endpoint device is received at the interface at least one of periodically, upon request, when an application is installed on the first endpoint device, or when an application is executed on the first endpoint device.

5. The method of claim 1, further comprising:
identifying a vulnerability associated with the first endpoint device, wherein the first signature is determined based on the vulnerability.

6. The method of claim 1, wherein:
the second contextual data associated with the second endpoint device indicates that the second endpoint device lacks vulnerabilities.

7. The method of claim 1 wherein determining the first signature from the plurality of signatures includes referencing one or more configuration rules in a database using the received first contextual data associated with the first endpoint device, wherein the one or more configuration rules reference at least one of firewall rules for certain ports or applications.

8. A threat management device comprising:
an interface for at least receiving:
first contextual data associated with a first endpoint device,
second contextual data associated with a second endpoint device that is different than the first endpoint device; and
one or more processors executing instructions stored on memory to:
analyze the first contextual data associated with the first endpoint device to determine at least a first signature from a plurality of signatures,
scan, using a first subsystem, network traffic associated with the first endpoint device using the first signature,
analyze the second contextual data associated with the second endpoint device
allow network traffic associated with the second endpoint device without scanning based on the analysis of the second contextual data indicating at least one of that an operating system executed by the second endpoint device is updated or that vulnerabilities are patched, wherein the second endpoint device is part of a same subnet of a network as the first endpoint device.

9. The threat management device of claim 8, wherein the first contextual data associated with the first endpoint device includes an operating system type that identifies an operating system being executed by the first endpoint device.

10. The threat management device of claim 8 wherein the one or more processors are further configured to issue, via the interface, a query to the first endpoint device for the first contextual data associated with the first endpoint device.

11. The threat management device of claim 8, wherein the first contextual data associated with the first endpoint device is received at the interface at least one of periodically, upon request, when an application is installed on the first endpoint device, or when an application is executed on the first endpoint device.

12. The threat management device of claim 8 wherein the threat management device is further configured to:
identify a vulnerability associated with the first endpoint device, wherein the first signature is determined based on the vulnerability.

13. The threat management device of claim 8 wherein the second contextual data associated with the second endpoint device indicates that the second endpoint device lacks vulnerabilities.

14. The threat management device of claim 8 wherein the one or more processors determine the first signature from the plurality of signatures by referencing one or more configuration rules in a database using the received first contextual data associated with the first endpoint device, wherein the one or more configuration rules reference at least one of firewall rules for certain ports or applications.

15. A computer program product for threat detection, the computer program product comprising one or more non-transitory computer readable media and computer executable code embodied in the one or more non-transitory computer readable media that, when executing on one or more processors, performs the steps of:
receiving, at an interface of a threat management device, first contextual data associated with a first endpoint device that is in operable connectivity with the threat management device, wherein the threat management device is configured to execute a first subsystem;
receiving, at the interface of the threat management device, second contextual data associated with a second endpoint device that is different than the first endpoint device and in operable connectivity with the threat management device, wherein the threat management device is further configured to execute a second subsystem;
analyzing the first contextual data associated with the first endpoint device to determine at least a first signature from the plurality of signatures; and
scanning, using the first subsystem, network traffic associated with the first endpoint device using the first signature;
analyzing the second contextual data associated with the second endpoint device;
allowing network traffic associated with the second endpoint device without scanning based on the analysis of the second contextual data indicating at least one of that an operating system executed by the second endpoint device is updated or that vulnerabilities are patched,
wherein the second endpoint device is part of a same subnet of a network as the first endpoint device.

16. The computer program product of claim 15 wherein the first contextual data associated with the first endpoint device includes an operating system type that identifies an operating system.

17. The computer program product of claim 15 for threat detection, wherein the computer executable code for determining the first signature from the plurality of signatures includes computer executable code for referencing one or more configuration rules in a database using the received first contextual data associated with the first endpoint device, wherein the one or more configuration rules reference at least one of firewall rules for certain ports or applications.

* * * * *